United States Patent [19]

Goodman et al.

[11] Patent Number: 4,932,898

[45] Date of Patent: Jun. 12, 1990

[54] TERMINATION SYSTEM FOR COAXIAL CONDUCTOR

[75] Inventors: David S. Goodman, Mission Viejo, Calif.; Herve G. Bricaud, Dole, France; Henry S. Heath, Fullerton, Calif.

[73] Assignee: ITT Corporation, New York, N.Y.

[21] Appl. No.: 307,107

[22] Filed: Feb. 7, 1989

[51] Int. Cl.⁵ .............................................. H01R 17/04
[52] U.S. Cl. .................................... 439/582; 439/585; 439/904; 439/874
[58] Field of Search ................................ 439/578–585, 439/675, 874–876, 877, 322, 466, 468, 901, 904, 905

[56] References Cited

U.S. PATENT DOCUMENTS

| | | |
|---|---|---|
| 3,530,425 | 9/1970 | Vachani ................................ 439/583 |
| 3,836,946 | 9/1974 | Geiger .................................. 439/582 |
| 4,025,150 | 5/1977 | Nordberg et al. ................... 439/583 |
| 4,261,630 | 4/1981 | Knappenberger .................... 339/31 |
| 4,655,534 | 4/1987 | Steerson .............................. 439/582 |
| 4,678,261 | 7/1987 | Mitani et al. ........................ 439/585 |
| 4,772,222 | 9/1988 | Laudig et al. ....................... 439/578 |

Primary Examiner—David Pirlot
Attorney, Agent, or Firm—Thomas L. Peterson

[57] ABSTRACT

A right-angle termination for a coaxial conductor is described, which has an access aperture that provides good access for soldering the inner conductor of the termination device to the inner conductor of a coaxial cable, and which enables rapid and easy closure of the access aperture. A sleeve is slideably mounted about the outer conductor of the termination device, to slide between an open position away from the access aperture, and a closed position over the access aperture.

9 Claims, 3 Drawing Sheets

TERMINATION SYSTEM FOR COAXIAL CONDUCTOR

BACKGROUND OF THE INVENTION

One type of coaxial termination device has elongated inner and outer conductors and an insulator between them, that all extend along a main axis of the device between its front and rear ends. The rear end of the device is devoid of insulation to provide a hollow region where the inner conductor of the device can be soldered to the inner conductor of a coaxial cable that extends perpendicular to the main axis. After the soldering is complete, the rear end of the termination device must be closed to prevent RF (radio frequency) leakage and to seal against dirt. Thereafter, the termination device can be removably connected to coaxial apparatus by plugging into it.

Some difficulties are encountered in providing a convenient access aperture which can be sealed after the soldering operation, in a manner that avoids loose parts that might become lost, and that avoids more than minimal instruction to assemble, all in a low cost and reliable termination device. One approach that has been used has been to leave the extreme rear end of the cylindrical outer conductor open so the tip of a solder iron can be inserted therethrough, and to provide a disc-shaped cover that can close the open end. This has the disadvantage that access to the location to be soldered is limited, and the disc is a loose item that may lost until it is fastened in place. Another approach described in U.S. Pat. No. 4,772,222 involves the use of a removable cover held by hooks and spring pressure over a solder connection. However, the cover is a relatively expensive item, and is a loose item that may not be available when needed. A termination device which provided a convenient access hole for soldering its inner conductor to that of a coaxial cable, and which enabled the closing of the access opening in a simple manner without requiring loose or costly parts, would be of considerable value.

SUMMARY OF THE INVENTION

In accordance with one embodiment of the present invention, a coaxial termination device is provided which has an access aperture for use in soldering or otherwise joining the inner conductor of the termination device to that of a coaxial cable, which enables the subsequent closing of the aperture in a simple and low cost construction. The coaxial termination device includes an outer conductor with an access aperture in its side for access to inner coaxial conductors lying therein, and includes a sleeve slideable along the termination device so the sleeve initially lies away from the access aperture, and can then be slid to close the access aperture. A coaxial cable coupling which joins to another portion of the termination device, can hold the sleeve in the closed position.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
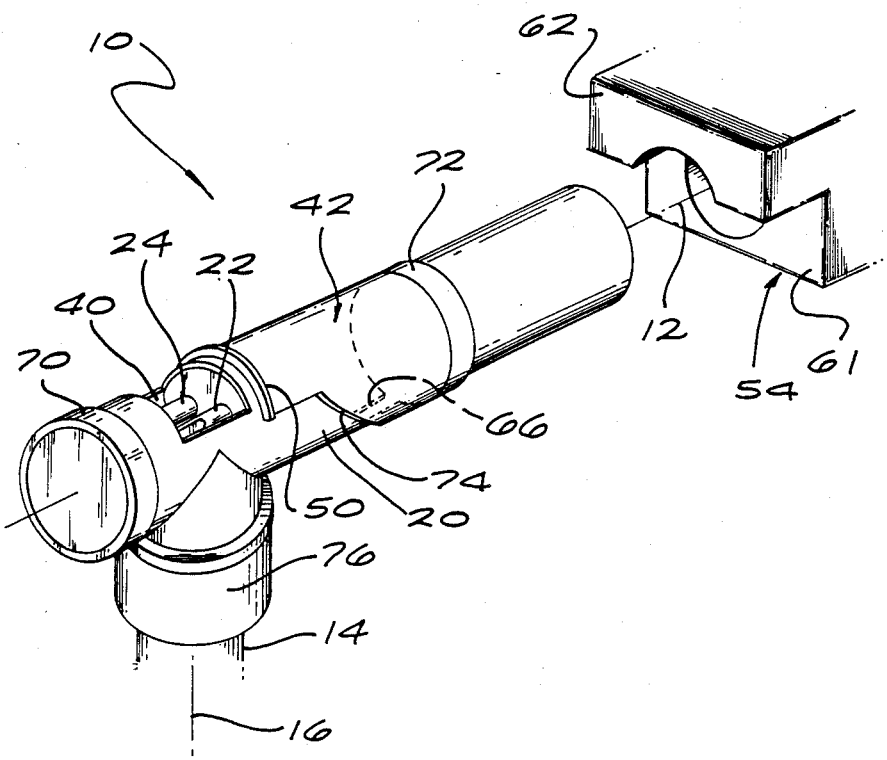
FIG. 1 is a perspective view of a coaxial termination device constructed in accordance with one embodiment of the present invention, shown with the sleeve in an open position.
Figure 2:
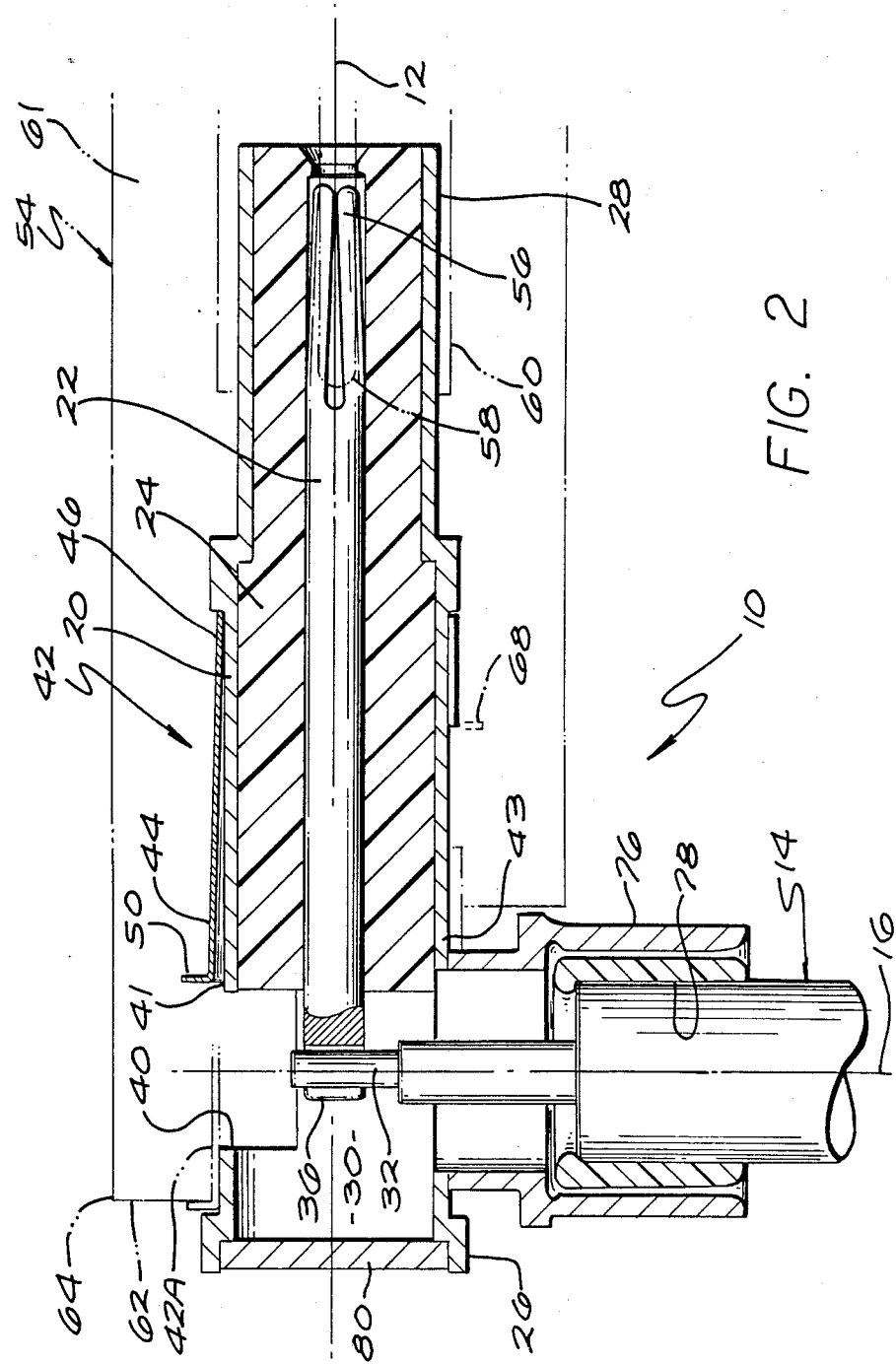
FIG. 2 is a sectional view of the termination device of FIG. 1.
Figure 4:
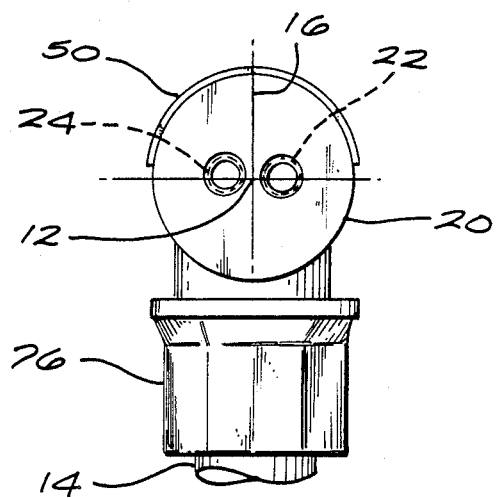
FIG. 4 is a rear end view of the termination device of FIG. 2.

FIG. 1 illustrates a right angle coaxial termination device 10 which includes largely coaxial conductors extending along the main axis 12 of the device, and which can connect to a coaxial cable 14 extending along a perpendicular axis 16. The particular termination device 10 includes one outer conductor 20 and two spaced inner conductors 22, 24, and the coaxial cable 14 similarly has two inner conductors. As also shown in FIG. 2, the inner and outer conductors of the termination device are separated by an insulator 24. The termination device has rear and front end portions 26, 28, with the insulator ending at the rear end portion to leave a cavity 30 where the inner termination conductors 22, 24 can be connected to corresponding inner conductors 32, 34 (FIG. 3) of the coaxial cable 14.

The inner termination conductors such as 22 have slots 36 that each receive an inner conductor of the cable 14. Completion of termination is accomplished by permanently joining corresponding inner conductors such as 22 and 32, as by soldering them together. The outer termination conductor 20 has an access aperture 40 at one side 41 and a termination aperture 78 at an opposite side 43. The tip of a soldering iron or other joining apparatus can be inserted through the access aperture to join the ends of corresponding inner conductors such as 22 and 32. After the joining operation has been completed, the access aperture 40 must be closed to prevent RF (radio frequency) leakage and to seal out dirt.

The termination device includes a sleeve 42 mounted about the outer conductor 20 and slideable therealong. The sleeve has rear and front end portions 44, 46. The sleeve is kept in an open position shown in solid lines in FIG. 2 during the soldering operation. After soldering is completed, the sleeve is slid in a rearward direction to the position shown at 42A wherein the rear end portion of the sleeve lies over the access aperture 40 to close it. The sleeve has an outwardly-extending flange 50 at its rear end, which facilitates sliding of the sleeve along the length direction of the termination device, as with the technician's fingers or automatically by a coupling as described below.

After the coaxial cable 14 has been attached to the termination device, the termination device is used for "plugging into," or connection, to a coupling 54 which receives or delivers signals through the coaxial conductors of the termination device. To this end, the inner coaxial conductors of the termination device have clip-like ends 56 which can receive and resiliently contact pins 58 of the coupling, while an outer conductor 60 of the coupling contacts the outer termination conductor 20.

In the particular system shown in FIG. 2, the coupling includes a housing 61 forming an outer isolator with a front end forming a shoulder 62 that can push forwardly against the flange 50 at the front of the sleeve 42, to slide the sleeve to its closed position and prevent rearward movement of the sleeve after the termination device has been mated to the coupling. A flange indicated at 68 could be provided at the other side of the sleeve. The coupling surrounds the sleeve, and the rear portion 64 of the coupling housing presses firmly against the front of the sleeve to press it against the side of the termination outer conductor 20 to avoid a gap of appreciable width between the front of the sleeve and the outer conductor of the termination device.

The outer conductor 20 of the termination device is largely cylindrical at the part which holds the sleeve. The sleeve 42 is constructed of sheet metal rolled into a cylindrical shape, but with a gap 66 (FIG. 1) that allows the sleeve to be slipped onto the termination device over shoulders 70 or 72 at the rear and front portions of the termination device. The shoulders prevent loss of the sleeve. While one side of the sleeve which forms the flange 50 extends far rearward, the opposite side of the sleeve has a cutout 74 that avoids interference with a tube 76 that forms a termination aperture 78 that receives the coaxial cable 14.

The termination device 10 is connected to the coaxial conductor 14 by first stripping away insulation around the inner conductors 32, 34 of the coaxial cable, and inserting the coaxial cable into the termination aperture 78 to the position shown in the figures. The outer conductor of cable 14 is crimped in place. Then solder, flux, and the tip of a soldering tool are projected through the access aperture 40 to solder together the corresponding inner conductors of the coaxial cable 14 and of the termination device 10. A technician can then press rearwardly on the flange 50 to close the sleeve. The termination device with the coaxial cable connected thereto, is then ready for plugging into the coupling 54.

Figure 3:
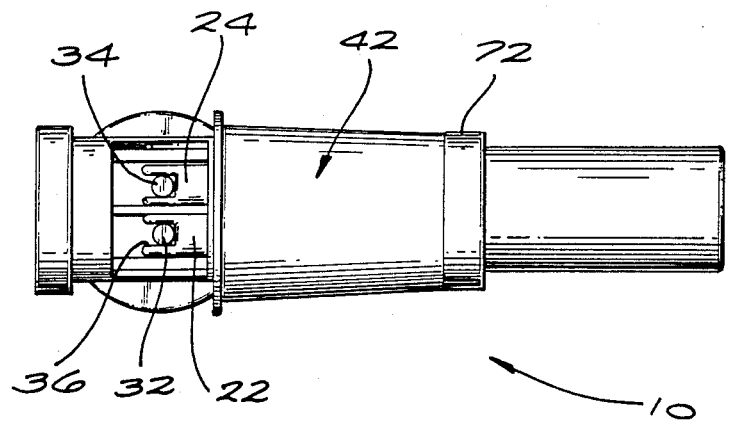
FIG. 3 is a plan view of the termination device of FIG. 2.

The access aperture 40 and termination aperture 78 lie on opposite sides of the outer conductor 20 of the termination device, at locations spaced from the extreme rear end 80 of the device. By thus providing access to the inner conductors from a side of the termination device opposite the termination aperture 78, the technician has access to the entire circumference of each inner conductor 32, 34 of the coaxial cable (as shown in FIG. 3), which facilitates making a good solder joint. This is preferable to access through the extreme rear end 80 of the termination device. The access aperture 40 is automatically held closed when the termination device is plugged into the housing of a coupling, when access is not required. If there is a poor solder joint, the sleeve can be retracted for new access to the joint.

Figure 5:
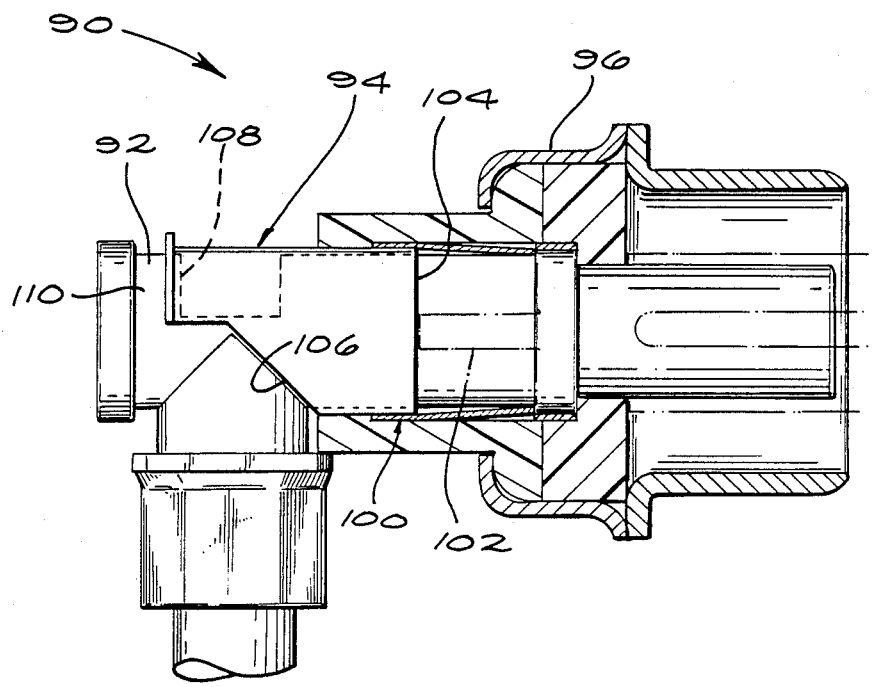
FIG. 5 is a side elevation view of a termination device constructed in accordance with another embodiment of the invention, shown in a closed position and mated with a coupling.

FIG. 5 illustrates another system 90 which uses a termination device 92 with a modified sleeve 94, and a coupling 96 with a modified housing. The coupling 96 includes a clip 100 with resilient lances or fingers 102 that can engage the front end 104 of the sleeve 94 to prevent it from moving forwardly. The cutout 106 in the sleeve is just large enough to limit rearward movement of the sleeve to a position at which the rear portion of the sleeve covers the access aperture 108 in the outer conductor 110 of the termination device.

Thus, the invention provides a coaxial termination device which enables relatively good access to the ends of inner conductors to facilitate joining them as by soldering, and which facilitates closing of the access aperture, all in a low cost and easily operated device. The access aperture lies at a side of the termination outer conductor, which is opposite the termination aperture through which the coaxial cable is received, and closing of the access aperture is by means of a sleeve which can slide on the termination device. A coupling to which the front end of the termination device is mated, includes means for holding the sleeve in its closed position. While the particular termination device which is shown has two inner conductors, the invention is useful for a device with one or more than two inner conductors.

Although particular embodiments of the invention have been described and illustrated herein, it is recognized that modifications and variations may readily occur to those skilled in the art and consequently it is intended to cover such modifications and equivalents.

What is claimed is:

1. A coaxial termination device comprising:
an electrically conductive substantially cylindrical elongated outer conductor having a length and front and rear end portions spaced along said length, and having first and second opposite sides, said rear end portion having a closed rear end and said front end portion being open, said rear end portion of said outer conductor having termination and access apertures respectively in said first and second sides;
a tube lying about said termination aperture and extending substantially perpendicular to the length of said outer conductor;
at least one inner conductor extending within said outer conductor between said front end portion and said apertures, and an insulator lying between said inner and outer conductors, said inner conductor extending rearward of said insulator;
a sleeve lying about said outer conductor and slideable thereon in forward and rearward directions to lie respectively in open and closed positions, said sleeve having an aperture-closing portion on the same side of said main housing as said access aperture and which closes said access aperture in said closed position and opens it in said open position, and said sleeve having a cutout on the same side of said main housing as said termination aperture to avoid interference with said tube.

2. The device described in claim 1 wherein:
said outer conductor has forward and rearward shoulders lying respectively forward and rearward of said sleeve, and said sleeve is largely cylindrical but has a gap that allows it to expand to pass over one of said shoulders, said sleeve then tending to contract so it abuts said shoulders in sliding too far forward and rearward, to thereby retain the sleeve.

3. The device described in claim 1 including:
a coupling having inner and outer conductors formed to mate with the front portions of said first-mentioned conductors;
said sleeve has an outwardly-extending flange at its rear portion and said coupling having a shoulder that lies in the way of forward movement of said flange, whereby to keep the sleeve in the closed position.

4. The device described in claim 1 including:
a coupling with inner and outer conductors formed to mate with the front portion of said first-mentioned conductors, said coupling having a rear portion which holds the rear of the sleeve substantially against said first side of said first-mentioned conductor.

5. In a coaxial termination device having a main axis and inner and outer termination conductors, each conductor having front and rear end portions spaced along the direction of said main axis, with the outer conductor having a coaxial cable-receiving termination aperture at one side of its rear end portion extending in a second direction substantially perpendicular to said main axis, the improvement wherein:

said outer conductor has an access aperture lying at a side of its rear end portion opposite said termination aperture; and including a tube lying about said termination aperture and extending in said second direction;

a sleeve mounted about said outer conductor, said sleeve having front and rear portions, said sleeve being slideable between open and closed positions wherein said sleeve front portion lies respectively away from and over said access aperture, and said sleeve having a cutout on a side opposite said aperture-closing portion, for preventing interference with said tube.

6. In a coaxial termination device having a main axis and inner and outer termination conductors, each conductor having front and rear end portions spaced along the direction of said main axis, with the outer conductor having a coaxial cable-receiving termination aperture at one side of its rear end portion extending in a second direction substantially perpendicular to said main axis, the improvement wherein:

said outer conductor has an access aperture lying at a side of its rear end portion opposite said termination aperture; and including a sleeve mounted about said outer conductor, said sleeve having front and rear portions, said sleeve being slideable between open and closed positions wherein said sleeve front portion lies respectively away from and over said access aperture; and a clip which extends about said outer conductor and which engages the front portion of said sleeve when the sleeve is in its closed position, to resist forward sliding of said sleeve.

7. In a coaxial termination device having a main axis and inner and outer termination conductors, each conductor having front and rear end portions spaced along the direction of said main axis, with the outer conductor having a coaxial cable-receiving termination aperture at one side of its rear end portion extending in a second direction substantially perpendicular to said main axis, the improvement wherein:

said outer conductor has an access aperture lying at a side of its rear end portion opposite said termination aperture; and including a sleeve mounted about said outer conductor, said sleeve having front and rear portions, said sleeve being slideable between open and closed positions wherein said sleeve front portion lies respectively away from and over said access aperture; and a coupling with inner and outer conductors formed to mate with the front ends of said termination device conductors, said coupling including a housing which presses the rear portion of said sleeve toward said outer conductor to minimize any gap between said sleeve and said outer termination conductor.

8. A coaxial termination device comprising:

an electrically conductive elongated outer conductor having an axis, a length extending along said axis, and front and rear end portions spaced along said length, and having first and second opposite sides, said rear end portion having a closed rear end and said front end portion being open, said rear end portion of said outer conductor having termination and access apertures respectively in said first and second sides;

at least one inner conductor extending within said outer conductor between said front end portion and said apertures, and an insulator lying between said inner and outer conductors, with said inner conductor extending rearward of said insulator;

a sleeve lying about said outer conductor and slideable thereon along said axis in open and closed positions, said sleeve surrounding said outer conductor to hold itself to said outer conductor in both said open and closed positions, said sleeve having an aperture-closing portion on the same side of said main housing as said access aperture and which closes said access aperture in said closed position.

9. The device described in claim 8 wherein:

said rear portion of said sleeve forms an outwardly-extending flange; and including a coupling which receives said front portion of said outer conductor and which engages said flange to move said sleeve rearwardly to said closed position if said sleeve is initially in said open position, when said coupling receives said outer conductor.

* * * * *